United States Patent
Hager et al.

(10) Patent No.: US 7,280,917 B2
(45) Date of Patent: Oct. 9, 2007

(54) SYSTEMS AND METHODS FOR CONTROLLING A LANDING POSITION OF SENSORS DEPLOYED FROM AN AIR VEHICLE

(75) Inventors: James R. Hager, Golden Valley, MN (US); Steven H. Thomas, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 304 days.

(21) Appl. No.: 10/989,879

(22) Filed: Nov. 16, 2004

(65) Prior Publication Data

US 2006/0106558 A1   May 18, 2006

(51) Int. Cl.
   G06F 19/00   (2006.01)
   B64C 9/00   (2006.01)

(52) U.S. Cl. .................................. 701/220; 244/164

(58) Field of Classification Search ............ 701/1, 701/3, 4, 13, 220; 244/3.2, 3.21, 164; 342/33, 342/34

See application file for complete search history.

(56) References Cited

U.S. PATENT DOCUMENTS

| | | | |
|---|---|---|---|
| 5,722,618 A | 3/1998 | Jacobs et al. | |
| 5,884,867 A | 3/1999 | Gordon et al. | |
| 6,131,856 A | 10/2000 | Brown | |
| 6,307,514 B1 | 10/2001 | West | |
| 6,338,457 B1 | 1/2002 | Hilliard et al. | |
| 6,400,647 B1 | 6/2002 | Huntress | |
| 6,531,965 B1 | 3/2003 | Kaiser et al. | |
| 6,539,327 B1 | 3/2003 | Dassot et al. | |
| 6,666,410 B2 * | 12/2003 | Boelitz et al. ........... 244/171.1 |
| 6,758,442 B2 | 7/2004 | Bailey | |
| 6,868,314 B1 * | 3/2005 | Frink ............................ 701/3 |
| 6,980,152 B2 * | 12/2005 | Steadman et al. ............ 342/14 |
| 7,039,367 B1 * | 5/2006 | Kucik ......................... 455/96 |

* cited by examiner

Primary Examiner—Dalena Tran
(74) Attorney, Agent, or Firm—Evan Bundis, Esq.; Armstrong Teasdale LLP

(57) ABSTRACT

A sensing device is described that is configured to be launched from an air vehicle for deployment on the ground. The sensing device includes at least one sensor, an inertial measurement unit (IMU), at least one flight control surface, a flight control unit configured to control a position of the flight control surfaces, and a processing unit. The processing unit is coupled to the IMU and is configured to receive a desired trajectory from an external source and, upon launch of the sensing device, is further configured to determine an error between the desired trajectory and a current position as determined by the IMU. The processing unit is also configured to cause the flight control unit to adjust a position of the flight control surfaces to minimize the error.

21 Claims, 2 Drawing Sheets

SYSTEMS AND METHODS FOR CONTROLLING A LANDING POSITION OF SENSORS DEPLOYED FROM AN AIR VEHICLE

BACKGROUND OF THE INVENTION

This invention relates generally to deployment of sensors within a surveillance area, and more specifically, to systems and methods for controlling a landing position of ground sensors deployed from an air vehicle.

To provide surveillance for an area, sensing devices of various forms are typically placed in some desired pattern on the ground to sense the presence of, for example, people, animals, and vehicles, commonly referred to herein as intruders, within the area. In addition to detecting the presence of intruders, other applications utilizing various sensors include one or more of identification, location, speed of travel, and travel direction of such intruders. The purpose in at least some of these applications includes one or more of military threat detection, statistical data gathering, security purposes, for example, for intruder detection in and around nuclear power plants, aircraft parking areas, water supply systems, and private property to name a few.

To provide the desired surveillance, the sensing devices typically incorporate one or more of several sensor types. The various sensor types are operable for, for example, vibration sensing, acoustical sensing, magnetic sensing, temperature sensing, and additionally, GPS functionality to provide location data for each individual sensing device. With a location of each individual sensing device known, and through communication from individual sensing devices to a common base station, triangulation utilizing the sensing devices provides a capability to locate the source of the sensed parameter. Locations are typically provided in latitude and longitude coordinates.

In certain deployments, due to accessibility issues, the sensing devices are deployed by launching or dropping the sensing devices from an air vehicle. The sensing devices for such deployments are configured with a weighted leading edge having a point. It is hoped that conditions during the descent of such devices will allow the point to eventually penetrate the ground providing a particular orientation for the individual sensors within the sensing device and allow the device to be self supported in an upright orientation.

The unguided nature of these sensing devices, however, sometimes results in ground deployment location errors, and orientations other than a desired orientation. These location and orientation inaccuracies result in a relatively large number of the deployed sensing devices being unusable, or at least providing inaccurate information from one or more of the individual sensors within the sensing device.

BRIEF SUMMARY OF THE INVENTION

In one aspect, a sensing device configured to be launched from an air vehicle for deployment on the ground is provided. The sensing device comprises an inertial measurement unit (IMU), at least one flight control surface, a flight control unit configured to control a position of the at least one flight control surface, and a processing unit. The processing unit is coupled to the IMU and configured to receive a desired trajectory from an external source. The processing unit is further configured to, upon launch of the sensing device, determine an error between the desired trajectory and a current position as determined by the IMU, and cause the flight control unit to adjust a position of the flight control surfaces to minimize the error.

In another aspect, a unit for initializing sensing devices for launch from an air vehicle is provided. The unit comprises at least one processor configured with an air vehicle release position estimation algorithm configured to calculate a desired position for launching the sensing devices. The estimation utilizes a received desired deployment position for each sensing device and a received current velocity, direction and position of the air vehicle. The at least one processor is further configured with a trajectory algorithm configured to output a trajectory to a sensing device, said trajectory algorithm configured to calculate the trajectory from the calculated position for launching the sensing devices and the current velocity, direction and position of the air vehicle.

In still another aspect, a processing unit for a sensing device is provided. The sensing device is configured to be launched from an air vehicle for deployment on the ground and the unit is configured to receive a desired trajectory from an external source and, upon launch of the sensing device, determine an error between the desired trajectory and a current position as determined by an inertial measurement unit within the sensing device. The processing unit is further configured to cause adjustments to a position of one or more flight control surfaces of the sensing device to minimize the error between the desired trajectory and the current position.

In yet another aspect, a method for deploying a sensing device from an air vehicle for utilization on the ground is provided. The method comprises configuring the sensing device for initialization with a desired trajectory and a current position, programming the sensing device to determine an error between the desired trajectory and a current position during its descent, and configuring the sensing device to adjust a position of one or more flight control surfaces of the sensing device to minimize the error.

DETAILED DESCRIPTION OF THE INVENTION

Figure 1:
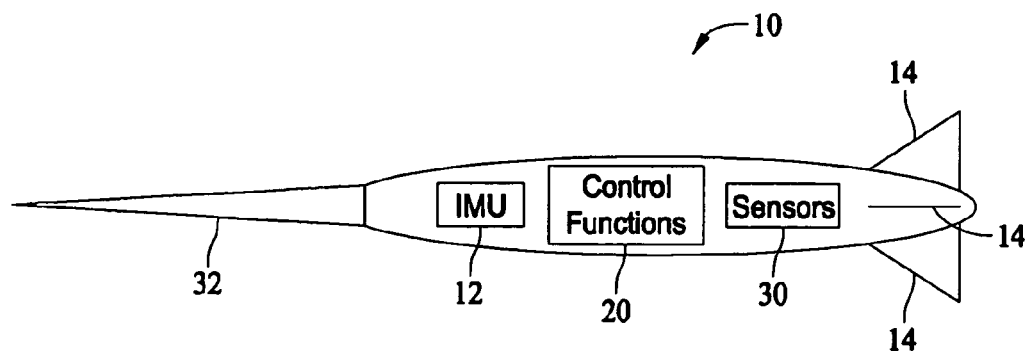
FIG. 1 is a block diagram of, a sensing device incorporating an inertial measurement unit.

FIG. 1 is a block diagram of a sensing device 10. As described herein, sensing device 10 is configured to guide itself to the desired deployment location and to orient itself in a vertical orientation. Sensing device 10 accomplishes the guidance and orientation through the addition of an inertial measurement unit (IMU) 12 and operable flight control surfaces 14 to sensing device 10. Operation of IMU 12 and operable flight control surfaces 14 is controlled through control functions 20. Sensing device 10 is also configured with one or more sensors 30 which provide the desired surveillance functions as described herein.

When deploying one or more of sensing devices 10, a desired placement for each sensing device 10, for example, a latitude and longitude location, is known before it is launched or dropped from an air vehicle. Just prior being dropped from the air vehicle, a desired trajectory, or path of travel, from the release location to the desired deployment location, is loaded into each sensing device 10. Sensing devices 10 are configured such that IMU 12 provides a position error indicative of a difference between the actual position and the desired trajectory to control function 20. Control function 20 controls the direction of travel of sensing device 10 by adjusting flight control surfaces 14 to direct sensing device 10 back to the desired trajectory which results in surface penetration of a nose 32 of sensing device 10 with a substantially vertical orientation and substantially at the desired latitude and longitude location.

Figure 2:
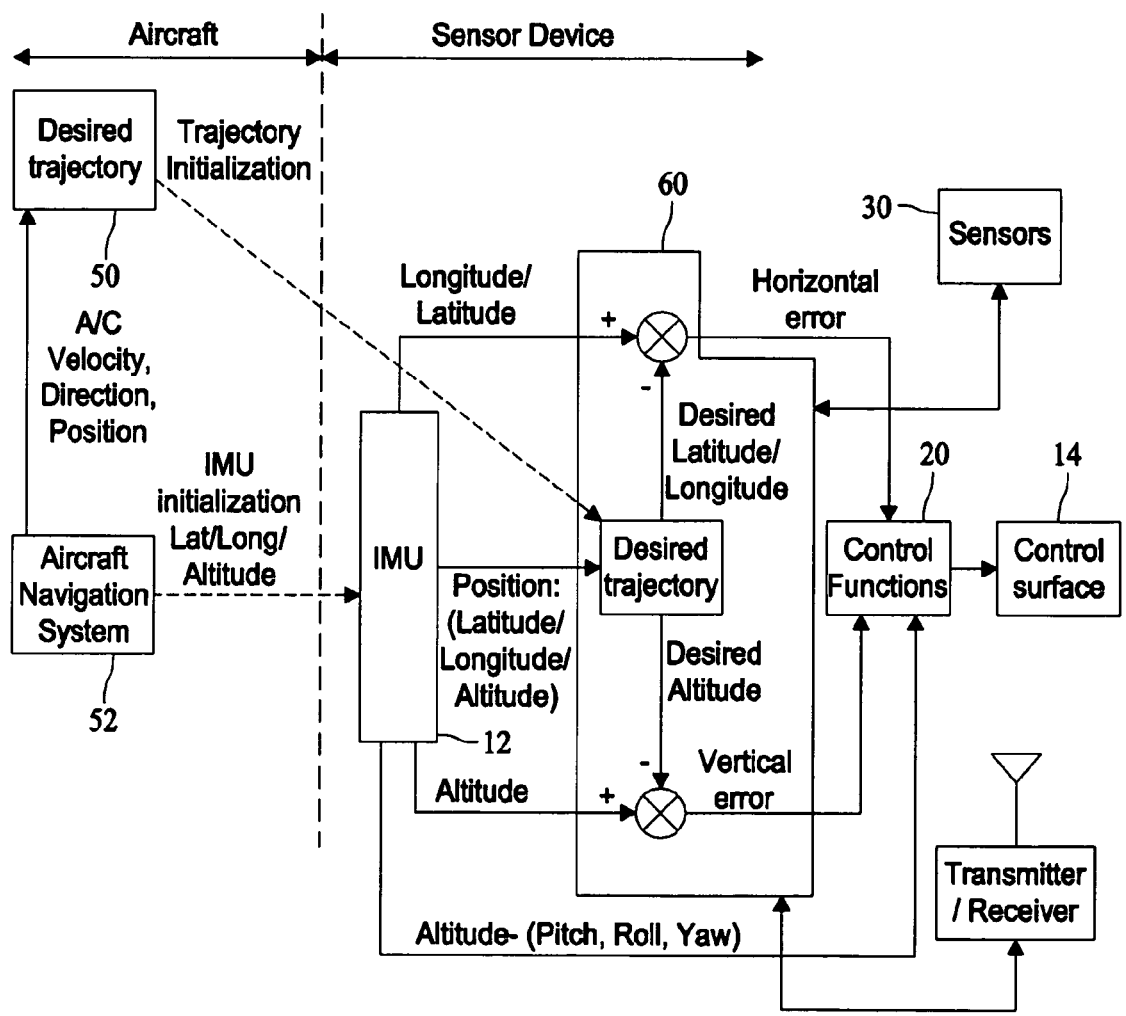
FIG. 2 is a functional block diagram of the sensing device of FIG. 1.

FIG. 2 is a functional diagram of sensor device 10, and also illustrates interfaces to certain systems within an air vehicle. More specifically, the air vehicle includes a sensor programming system 50 for communicating a desired trajectory and an aircraft navigation system 52 configured to output a latitude, longitude, and altitude of the air vehicle.

Sensor device 10 includes a processing unit 60 which receives desired trajectory information from sensor programming system 50. Processing unit 60 then initializes sensing device 10 with a desired trajectory shortly before release from the air vehicle. IMU 12 is initialized with a latitude, longitude, and altitude from aircraft navigation system 52 and, upon initialization, begins to provide a position (i.e., latitude, longitude, and altitude) to processing unit 60. In operation, IMU 12 is initialized by aircraft navigation system 52 and the desired trajectory is loaded into processing unit 60 just prior to release of sensing device 10 from the air vehicle.

During flight to the desired deployment positions, each launched sensing device 10 is guided through comparison of the loaded desired trajectory with a present position as determined by IMU 12. A current IMU derived location, latitude, longitude, and altitude, is correlated with the desired trajectory within processing unit 60, thereby determining a present desired latitude, longitude, and altitude.

As illustrated, a horizontal error is generated by comparing an actual latitude and longitude from IMU 12 with a desired latitude and longitude as determined within processing unit 60. A vertical error is generated by comparing an actual altitude from IMU 12 with a desired altitude as determined within processing unit 60. Both the horizontal error and vertical error are provided to control functions 20 which utilizes the errors to cause control surfaces 14 to move to a position which steers sensing device 10 until the horizontal error and vertical error provide an average error of zero. Processing unit 60 is therefore a part of a control loop which allows sensing device 10 to maintain the desired trajectory. Control functions 20, in one embodiment, receives attitude data, for example, pitch, roll, and yaw, as determined by IMU 12. In addition to adjusting control surfaces 14 to control a position of sensing device 10, control functions 20 utilize the attitude data from IMU 12 to adjust a position of control surface 14 in order to change an orientation of sensing device 10. Monitoring and adjusting an orientation of sensing device 10 provides that sensing device 10 will impact the ground substantially upright with a desired orientation.

Upon deployment on the ground, sensors 30 and a transceiver 70 communicate through processing unit 60 to provide a user with a transmitted sensor status. Additionally, a user may transmit commands to transceiver 70 which are intended to cause processing unit 70 to reconfigure sensors 30 according to a perceived need, for example, an increase or decrease in the sensitivity of one or more individual sensors within sensors 30.

Figure 3:
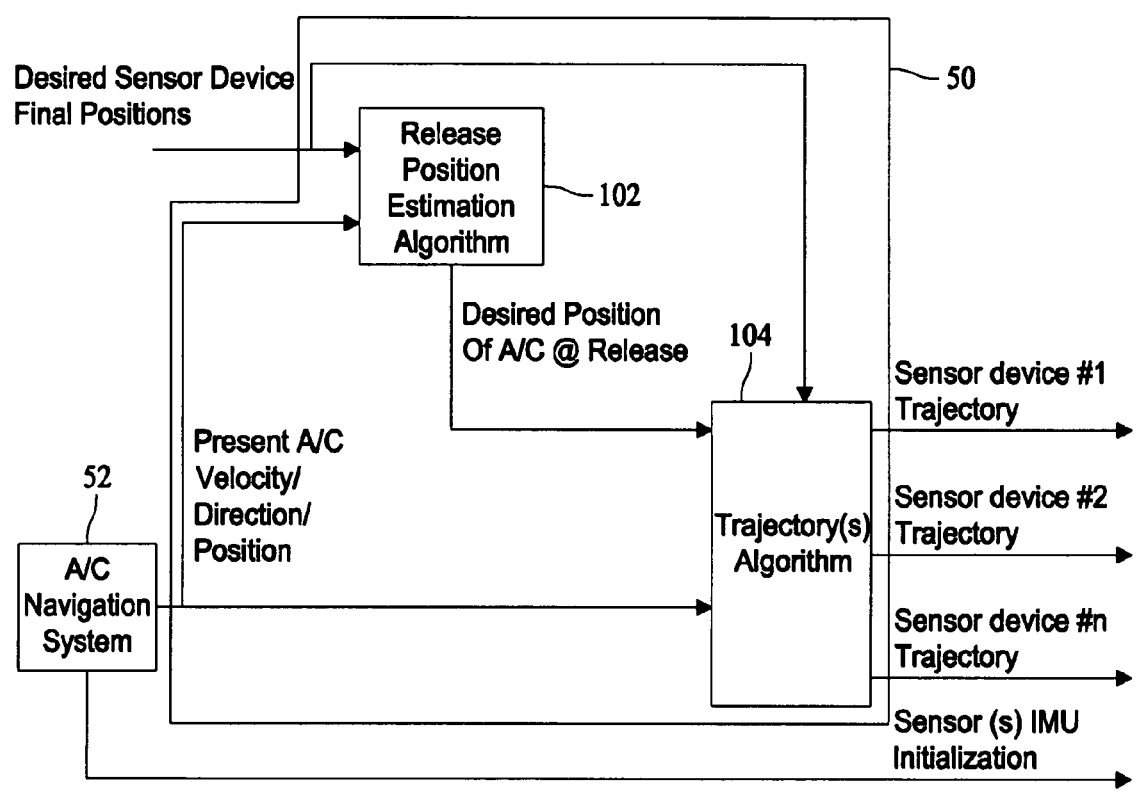
FIG. 3 is a block diagram of an initialization system utilized with a number of the sensing devices of FIG. 1.

FIG. 3 is a block diagram of sensor programming system 60 which is located within the air vehicle. Programming system 60 is programmed to provide an approximate desired trajectory to individual sensing devices 10 based on estimates of wind, position of air vehicle at sensing device release, velocity of the air vehicle (and thus sensing device 10 at release, and aerodynamic constraints of sensing devices 10. The trajectory estimate is simply a desired plot of for a three-dimensional (in XYZ coordinates) position of the individual sensing device 10. Due to winds and since sensing devices 10 are essentially gliders (not powered), an other than straight line solution to the target position is required to assure final descent attitude resulting in upright, vertical positioning of the sensing device 10 in the ground.

Aircraft navigation system 52 provides a present air vehicle velocity, direction, and position to both a release position estimation algorithm 102 and a trajectory estimation algorithm 104. Release position estimation algorithm 102 determines the approximate aircraft location at which to release sensing devices 10 based on a user programmed desired sensor device final position, winds estimate, known sensor flight aerodynamics and a measure of present air vehicle velocity vector and XYZ position. The release position estimate is utilized to assure the desired final position of an individual sensing device 10 is within its aerodynamic capabilities at release.

Trajectory algorithm 104 receives both present air vehicle velocity, direction, and position from aircraft navigation system 52 and a release position estimate from release position estimation algorithm 102 and estimates a best trajectory for each individual sensing device 10 based on the user programmed desired sensor device final position and the velocity, direction, and position of the air vehicle at the time of release.

The velocity, direction, and position of the air vehicle at the time of release is continuously updated as the air vehicle approaches the approximate position. A short time before sensing devices 10 are released from the air vehicle, for example, about one or two seconds prior to release, trajectory calculations from trajectory algorithm 104 and a present position from aircraft navigation system 52 are downloaded to each individual sensing device 10.

The above described sensing devices provide a solution to the problems associated with the deployment of sensing devices from an air vehicle. Utilization of such a closed loop system to provide guidance to dropped sensing devices results in an improvement over known deployment methods as the guidance substantially assures that the sensing devices will impact the ground with the desired orientation at the desired location.

Therefore, the sensing device deployment methods and the embodiments for the sensing devices described herein result in a higher percentage of such sensing devices that are usable on the ground. As such, while the guidance within the sensing devices increases costs, the more accurate deployment provides that, at least for certain deployments, fewer sensing devices need to be launched from an air vehicle in order to provide the desired surveillance for an area.

While the invention has been described in terms of various specific embodiments, those skilled in the art will recognize that the invention can be practiced with modification within the spirit and scope of the claims.

What is claimed is:

1. A sensing device configured to be launched from an air vehicle for deployment on the ground, said sensing device comprising:
   an inertial measurement unit (IMU);
   at least one flight control surface;
   a flight control unit configured to control a position of said at least one flight control surface; and a processing unit coupled to said IMU and configured to receive a desired trajectory from an external source, said processing unit, upon launch of said sensing device, configured to determine an error between the desired trajectory and a current position as determined by said IMU, said processing unit configured to cause said flight control unit to adjust a position of said at least one flight control surface to minimize the error.

2. A sensing device according to claim 1 wherein said IMU is initialized with a latitude, longitude, and altitude from a navigation system in the air vehicle.

3. A sensing device according to claim 1 wherein to determine an error between the desired trajectory and a current position said processing unit is configured to compare a latitude, longitude, and altitude from said IMU with a latitude, longitude, and altitude from the desired trajectory.

4. A sensing device according to claim 1 wherein said processing unit is configured to:
   determine a vertical error between an altitude from said IMU and a desired altitude within the desired trajectory; and
   determine a horizontal error between a latitude and longitude from said IMU and a desired latitude and longitude within the desired trajectory.

5. A sensing device according to claim 4 wherein the vertical error and the horizontal error are applied to said flight control unit.

6. A sensing device according to claim 1 wherein said flight control unit is configured to receive attitude data from said IMU.

7. A sensing device according to claim 6 wherein said flight control unit is configured to utilize the attitude data to adjust said at least one flight control surface to adjust an orientation of said sensing device.

8. A sensing device according to claim 1 further comprising:
   at least one sensor; and
   a transmitting device configured to transmit a status from said at least one sensor upon ground deployment of said sensing device.

9. A unit for initializing sensing devices for launch from an air vehicle, said unit comprising:
   an air vehicle release position estimation algorithm configured to calculate a desired position for launching the sensing devices from a received desired deployment position for each sensing device and a received current velocity, direction and position of the air vehicle; and
   a trajectory algorithm configured to output a trajectory to a sensing device, said trajectory algorithm configured to calculate the trajectory from the calculated position for launching the sensing devices and the current velocity, direction and position of the air vehicle.

10. A unit according to claim 9 wherein said trajectory algorithm is configured to determine a desired latitude and longitude for each of a series of altitudes for the sensing device.

11. A processing unit for a sensing device, the sensing device configured to be launched from an air vehicle for deployment on the ground, said unit configured to:
   receive a desired trajectory from an external source;
   configured to, upon launch of the sensing device, determine an error between the desired trajectory and a current position as determined by an inertial measurement unit within the sensing device; and
   cause adjustments to a position of one or more flight control surfaces of the sensing device to minimize the error between the desired trajectory and the current position.

12. A processing unit according to claim 11 wherein to determine an error between the desired trajectory and the current position, said processing unit is configured to compare a latitude, longitude, and altitude received from an inertial measurement unit with a latitude, longitude, and altitude from the desired trajectory.

13. A processing unit according to claim 11 configured to:
   determine a vertical error between an altitude from the inertial measurement unit and a desired altitude within the desired trajectory; and
   determine a horizontal error between a latitude and longitude from the inertial measurement unit and a desired latitude and longitude within the desired trajectory.

14. A processing unit according to claim 13 configured to apply the vertical error and the horizontal error to a flight control unit.

15. A method for deploying a sensing device from an air vehicle for deployment on the ground, said method comprising:
   configuring the sensing device for initialization with a desired trajectory and a current position;
   programming the sensing device to determine an error between the desired trajectory and a current position during its descent; and
   configuring the sensing device to adjust a position of one or more flight control surfaces of the sensing device to minimize the error.

16. A method according to claim 15 wherein configuring the sensing device for initialization comprises configuring the sensing device to receive a latitude, longitude, and altitude from a navigation system in the air vehicle.

17. A method according to claim 15 wherein programming the sensing device to determine an error between the desired trajectory and a current position comprises programming the sensing device to compare a latitude, longitude, and altitude from an inertial measurement unit within the sensing device with a latitude, longitude, and altitude from the desired trajectory.

18. A method according to claim 15 wherein determining an error between the desired trajectory and a current position comprises:
   determining a vertical error between an altitude from an inertial measurement unit within the sensing device and a desired altitude within the desired trajectory; and
   determining a horizontal error between a latitude and longitude from the inertial measurement unit and a desired latitude and longitude within the desired trajectory.

19. A method according to claim 18 wherein configuring the sensing device to adjust a position of one or more flight control surfaces comprises:
   configuring the sensing device to apply the vertical error and the horizontal error to a flight control unit; and
   configuring the flight control unit to adjust the flight control surfaces of the sensing device.

20. A method according to claim 15 further comprising configuring a flight control unit within the sensing device to receive attitude data from an inertial measurement unit within the sensing device.

21. A method according to claim 20 comprising configuring the flight control unit to utilize the attitude data to adjust the one or more flight control surfaces to adjust an orientation of the sensing device.

* * * * *